US011428268B2

(12) United States Patent
Dondaine et al.

(10) Patent No.: US 11,428,268 B2
(45) Date of Patent: Aug. 30, 2022

(54) ROLLING BEARING WITH WIRE RACES AND RETAINING RIB

(71) Applicant: Aktiebolaget SKF, Gothenburg (SE)

(72) Inventors: Herve Dondaine, Avallon (FR); Arnaud Guerard, Fontenay-pres-Vezelay (FR); Joshua Oliveira, Lucy-sur-cure (FR)

(73) Assignee: Aktiebolaget SKF, Gothenburg (SE)

( * ) Notice: Subject to any disclaimer, the term of this patent is extended or adjusted under 35 U.S.C. 154(b) by 9 days.

(21) Appl. No.: 17/031,215

(22) Filed: Sep. 24, 2020

(65) Prior Publication Data

US 2021/0190144 A1 Jun. 24, 2021

(51) Int. Cl.
*F16C 33/58* (2006.01)
*F16C 33/61* (2006.01)
*F16C 19/26* (2006.01)

(52) U.S. Cl.
CPC ............ *F16C 33/585* (2013.01); *F16C 19/26* (2013.01); *F16C 33/61* (2013.01); *F16C 2300/14* (2013.01)

(58) Field of Classification Search
CPC ........ F16C 19/26; F16C 19/36; F16C 19/361; F16C 33/583; F16C 33/585; F16C 33/61; F16C 2300/14
See application file for complete search history.

(56) References Cited

U.S. PATENT DOCUMENTS

| 3,478,402 | A | * | 11/1969 | Schmude | B21D 53/10 29/898.066 |
| 4,126,361 | A | | 11/1978 | Bottner et al. | |
| 4,422,697 | A | | 12/1983 | Gugel et al. | |
| 4,828,405 | A | | 5/1989 | Sinner | |
| 9,011,018 | B2 | * | 4/2015 | Toda | F16C 33/585 384/564 |
| 9,541,136 | B2 | | 1/2017 | Catalano | |
| 2019/0186543 | A1 | * | 6/2019 | Frank | F16C 19/381 |

FOREIGN PATENT DOCUMENTS

| DE | 202014003963 U1 | 6/2014 |
| EP | 3364061 * | 8/2018 |

* cited by examiner

*Primary Examiner* — James Pilkington
(74) *Attorney, Agent, or Firm* — Garcia-Zamor Intellectual Property Law; Ruy Garcia-Zamor; Bryan Peckjian

(57) ABSTRACT

The rolling bearing provides a first ring and second ring capable of rotating concentrically relative to one another, at least one first wire race mounted in the first ring, at least one second wire race mounted in the second ring, and at least one row of radial rollers radially interposed between raceways provided on the first and second wire races. The second ring comprises at least two guide flanges to axially retain therebetween the row of radial rollers. The first ring includes at least one retaining rib extending into the radial space that exists between the first and second rings and towards the second ring, the retaining rib protruding radially relative to the raceway of the first wire race.

9 Claims, 2 Drawing Sheets

ROLLING BEARING WITH WIRE RACES AND RETAINING RIB

CROSS-REFERENCE TO RELATED APPLICATIONS

This application claims priority to German Patent Application no. 102019220292.6, filed Dec. 19, 2019, the contents of which is fully incorporated herein by reference.

TECHNICAL FIELD OF THE INVENTION

The present invention relates to the field of rolling bearings. The invention particularly relates to the field of rolling bearings, in particular large-diameter rolling bearings, that can accommodate at least radial loads, and having an inner ring and an outer ring arranged concentrically about an axis of rotation running in an axial direction.

BACKGROUND OF THE INVENTION

Such rolling bearing comprises generally two concentric inner and outer rings, and at least one row of rollers radially arranged between the rings.

The rolling bearing may also comprise inner and outer wire races respectively mounted in the inner and outer rings and delimiting inner and outer raceways for the row of radial rollers.

One of the inner and outer rings also comprises two integral guide flanges to axially retain therebetween the row of radial rollers. The rollers are not axially maintained relative to the other ring.

Accordingly, the rollers can axially move relative to the other ring. In case of high axial displacement, the rollers can move away from the wire race of the ring during manutention, transport and/or assembly of the bearing.

Currently, in order to prevent such axial displacement, a temporary plate is axially mounted on one side of the rolling bearing and bolted on both rings.

However, this solution leads to use a temporary element which needs to be removed after mounting of the rolling bearing.

One aim of the present invention is to overcome this drawback.

SUMMARY OF THE INVENTION

The invention relates to a rolling bearing comprising a first ring and second ring capable of rotating concentrically relative to one another, at least one first wire race mounted in the first ring, at least one second wire race mounted in the second ring, and at least one row of radial rollers radially interposed between raceways provided on the first and second wire races.

The terms "radial rollers" is understood to mean rollers adapted to accommodate radial loads.

According to a general feature, the second ring comprises at least two guide flanges to axially retain therebetween the row of radial rollers.

According to another general feature, the first ring comprises at least one retaining rib extending into the radial space that exists between the first and second rings and extending towards the second ring. The retaining rib protrudes radially relative to the raceway of the first wire race.

With such design, during manutention, transport and/or assembly of the bearing, an axial displacement of the first ring relative to the rollers and the second ring can be blocked in one direction by the axial contact between the rib and the rollers.

Accordingly, it is not necessary to use a temporary plate as it is the case with a conventional rolling bearing.

The retaining rib may have an annular form. Alternatively, the first ring may comprise a plurality of retaining ribs spaced apart in the circumferential direction.

The retaining rib(s) may extend from an axial cylindrical surface of the first ring from which is formed a groove, the first wire race being disposed inside the groove.

The retaining rib(s) may be axially spaced from the radial rollers of the row. For example, the axial space between the retaining rib(s) and the rollers is less than half of the length of the rollers.

In one embodiment, the retaining rib(s) and the first ring are made into one part. Alternatively, the retaining rib(s) may be made separately from the first ring and secured thereto.

The radial dimension of the guide flange of the second ring, which is axially located on the side of the retaining rib with respect to the rollers, may be smaller than the radial dimension of the other guide flange.

In one embodiment, the guide flanges and the second ring are made into one part. Alternatively, the guide flanges may be made separately from the second ring and secured thereto.

In one embodiment, the guide flanges of the second ring may extend radially beyond the axes of rotation of the radial rollers of the row. Alternatively, the guide flanges may have a reduced radial dimension.

In one embodiment, considering a radial plane of the rolling bearing, the first and second wire races are symmetric with regard to the rotation axis of the roller.

In another embodiment, the axial length of the raceway of the first wire race is bigger than the axial length of the raceway of the second wire race.

With such design, since the raceway of the wire race is bigger on the ring where the rollers are not axially maintained, wider axial tolerances are permissible for the rolling bearing while keeping enough contact on the rolling surface of the rollers.

Therefore, for a manufacturer using the rolling bearing, it is possible to increase the machining tolerances of the structure frames onto which the rolling bearing is mounted.

To this end, the axial length of the raceway of the first wire race may also be bigger than the axial length of the radial rollers of the row.

Advantageously, the raceway of the first wire race may axially protrude outwards on each side of the radial rollers of the row.

In this particular embodiment, the retaining rib(s) may extend the wall of the groove of the first ring. Alternatively, the retaining rib(s) may be axially offset with regard to the wall of the groove.

The rolling bearing may also comprise a cage for maintaining the regular circumferential spacing of the rollers.

BRIEF DESCRIPTION OF THE FIGURES

The present invention and its advantages will be better understood by studying the detailed description of specific embodiments given by way of non-limiting examples and illustrated by the appended drawings on which.

DETAILED DESCRIPTION OF THE INVENTION

Figure 1:
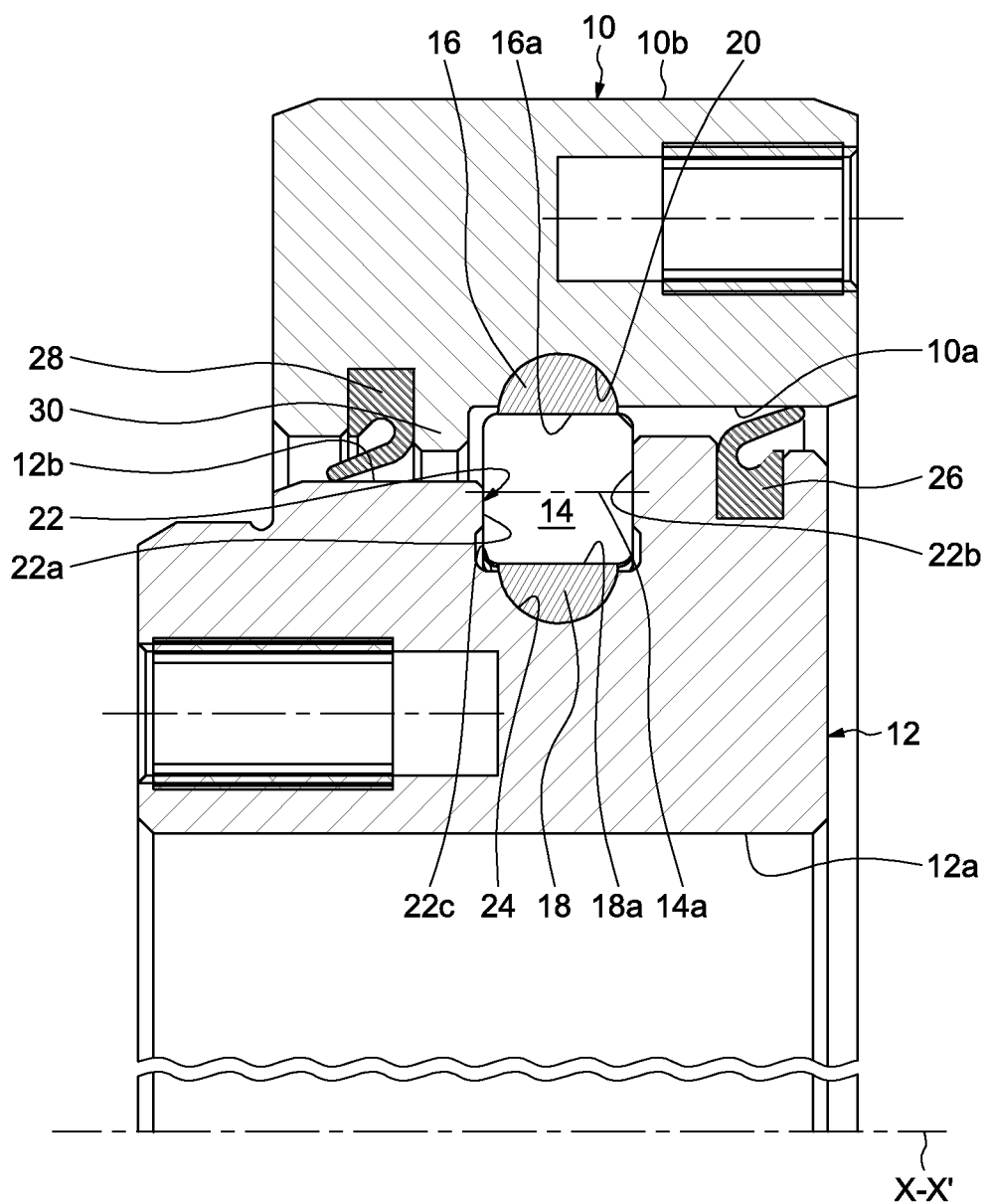
FIG. 1 is a partial cross-section of a rolling bearing according to a first example of the invention.

The rolling bearing as illustrated on FIG. 1 is a large-diameter rolling bearing comprising a first ring 10 and a second ring 12. In the illustrated example, the first ring 10 is the outer ring whereas the second ring 12 is the inner ring.

The outer and inner rings 10, 12 are concentric and extend axially along the bearing rotation axis X-X' which runs in an axial direction. The rings 10, 12 are of the solid type.

In the illustrated example, the rolling bearing comprises one row of radial rollers 14 which are arranged between the outer and inner rings 10, 12 in order to form a radial thrust.

The rollers 14 are identical to one another. Each roller 14 comprises a cylindrical outer rolling surface and two opposite frontal end surfaces axially delimiting the outer rolling surface. The axis 14a of rotation of each roller is parallel to the axis X-X' of the bearing.

The rolling bearing also comprises outer and inner wire races 16, 18, also named wire race rings, for the rollers which are respectively mounted in the outer and inner rings 10, 12. The wire races 16, 18 are formed from rolled wires whose ends are face to face.

The outer ring 10 comprises an inner cylindrical surface or bore 10a, and an outer cylindrical surface 10b which is radially opposite to the bore 10a. The outer ring 10 further comprises two opposite radial frontal surfaces (not referenced) which axially delimit the bore 10a and the outer surface 10b of the ring.

The outer ring 10 also comprises an annular groove 20 formed on the bore 10a and oriented radially inwards the inner ring 12. The groove 20 extends radially outwards from the bore 10a. The groove 20 has a toroidal form.

The outer wire race 16 is disposed within the groove 20 of the outer ring. The wire race 16 is continuous in the circumferential direction. The outer surface of the wire race 16 is of complementary shape to that of the groove 20. The wire race 16 is partly located inside the groove 20. As a matter of fact, in the illustrated example, the wire race 16 radially protrudes inwards with respect to the bore 10a of the outer ring.

The wire race 16 delimits an annular raceway 16a for the rollers 14. The raceway 16a comes into linear contact with the outer rolling surface of each roller 14. The raceway 16a is radially offset inwards with respect to the bore 10a of the outer ring. The raceway 16a is delimited by the bore of the wire race 16.

The inner ring 12 comprises an inner cylindrical bore 12a, and an outer cylindrical surface 12b which is radially opposite to the bore 12a. In the illustrated example, the outer cylindrical surface 12b has a stepped form. The inner ring 12 further comprises two opposite radial frontal surfaces (not referenced) which axially delimit the bore 12a and the outer cylindrical surface 12b.

The inner ring 12 also comprises an annular recess 22 formed on the outer surface 12b and oriented radially towards the outer ring 10. The recess 22 extends radially inwards from the outer surface 12b. The recess 22 radially faces the groove 20 and the wire race 16 of the outer ring.

The recess 22 is axially delimited by two annular side edges or walls 22a, 22b. The side walls 22a, 22b axially face each other. The side walls 22a, 22b are axially spaced apart from each other. The side walls 22a, 22b of the recess form integral guide flanges for the rollers 14 which axially retain therebetween the row of rollers 14. The side walls 22a, 22b are intended to come into axial contact with the frontal end faces of the rollers 14. The side walls 22a, 22b of the recess extends radially. In the disclosed embodiment, the side walls 22a, 22b extends radially beyond the axis 14a of each roller. Here, the radial dimension of the side wall 22a is smaller than the radial dimension of the side wall 22b. The recess 22 also comprises an annular bottom 22c connected to the side walls 22a, 22b. The bottom 22c extends axially.

The inner ring 12 further comprises an annular groove 24 formed in the bottom 22c of the recess and oriented radially towards the outer ring 10. The groove 24 extends radially inwards from the bottom 22c. The groove 24 radially faces the groove 20 and the wire race 16 of the outer ring. The groove 24 has a toroidal form.

The inner wire race 18 is disposed within the groove 24 of the inner ring. The wire race 18 is continuous in the circumferential direction. The bore of the wire race 18 is of complementary shape to that of the groove 24. The wire race 18 is partly located inside the groove 24. As a matter of fact, in the illustrated example, the wire race 16 radially protrudes outwards with respect to the bottom 22c of the recess. The wire race 18 is entirely located inside the recess 22.

The wire race 18 delimits an annular raceway 18a for the rollers 14. The raceway 18a comes into linear contact with the outer rolling surface of each roller 14. The raceway 18a is radially offset inwards with respect to the outer surface 12b of the inner ring. The raceway 18a is delimited by the outer surface of the wire race 18.

In this illustrated example, the wire races 16, 18 are identical. Considering a radial plane of the rolling bearing as illustrated on FIG. 1, the wire races 16, 18 are symmetric with regard to the rotation axis 14a of the roller.

The rollers 14 are radially interposed between the raceways 16a, 18a of the outer and inner wire races 16, 18. The outer rolling surface of each roller 14 comes radially into contact with the raceways 16a, 18a of the wire races.

In this example, the axial width of each of the inner and outer wire races 16, 18 is smaller than the axial length of the rollers 14. Thus, the axial length of each of the inner and raceways 16a, 18a is also smaller than the axial length of the rollers 14. The rollers 14 are not in contact with the raceways 16a, 18a over their entire length.

In the disclosed example, the rolling bearing further comprises on each side an annular seal 26, 28 respectively mounted on the outer and inner rings 10, 12 and provided to close the radial space that exists between these rings. This radial space is defined between the outer surface 12b of the inner ring and the bore 10a of the outer ring. A closed space is defined between the outer and inner rings 10, 12 and the seals 26, 28 in which the row of rollers 14 is disposed.

The outer ring 10 further comprises an annular shoulder or rib 30 extending into the radial space that exists between the outer and inner rings 10, 12 and extending towards the inner ring. The rib 30 protrudes radially relative to the raceway 16a of the outer wire race.

The rib 30 extends towards the outer surface 12b of the inner ring. The rib 30 remains radially spaced apart from the inner ring 12. The rib 30 extends from the bore 10a of the outer ring. The rib 30 extends radially. The rib 30 is axially spaced from the groove 20. The rib 30 is axially spaced from the rollers 14. A slight axial gap or space (not referenced) exists between the rib 30 and the rollers 14. Preferably, the axial space between the rib 30 and the rollers 14 is less than half of the length of the rollers. In the illustrated example, the rib 30 is axially located between the seal 28 and the row of rollers 14.

As previously mentioned, the radial dimension of the side wall 22a is smaller than the radial dimension of the side wall 22b. The side wall 22a has a reduced dimension since it is located axially on the side of the rib 30 with regard to the row of rollers 14.

During manutention, transport and/or assembly of the rolling bearing, an axial displacement of the outer ring 10 relative to the inner ring 12 is blocked in one direction by the axial contact between the rib 30 and the rollers 14.

Figure 2:
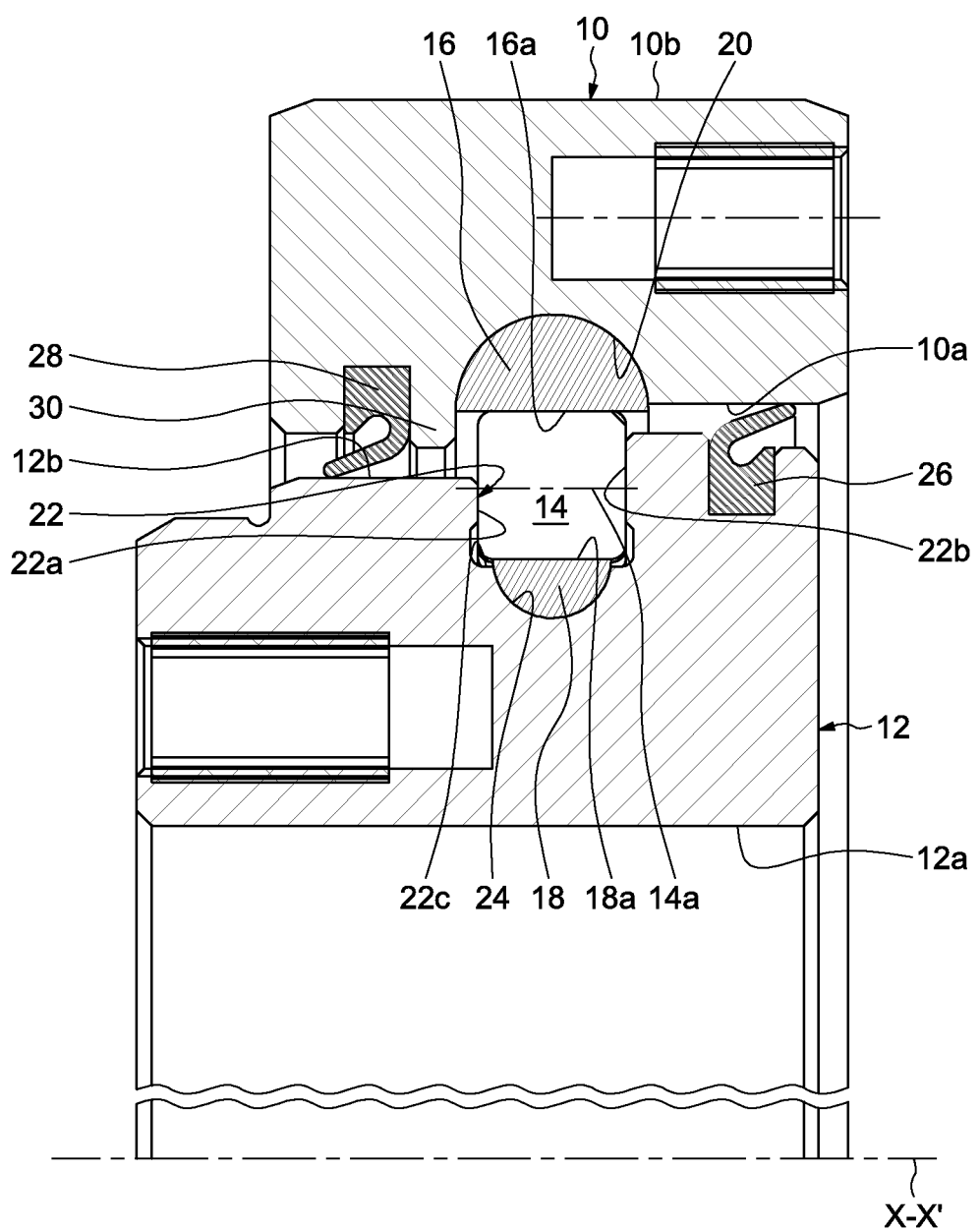
FIG. 2 is a partial cross-section of a rolling bearing according to a second example of the invention.

The example shown on FIG. 2, in which identical parts are given identical references, differs from the first example in that the axial width of the outer wire race 16 is bigger than the axial width of the inner wire race 18. The axial length of the outer raceway 16a is bigger than the axial length of the inner raceway 18a.

In the illustrated example, the axial width of the outer wire race 16 is also bigger than the axial length of the rollers 14. The axial length of the outer raceway 16a is bigger than the axial length of the rollers 14. The rollers 14 are in contact with the raceway 16a over their entire length. Here, the outer raceway 16a axially protrudes outwards on each side of the rollers 14.

With such design of the outer wire race 16, the rolling bearing allows axial clearance since the length of the outer raceway 16a is bigger than the one of the inner raceway 18a of the inner wire race. In the illustrated example, the outer raceway 16a is also bigger than the length of the rollers 14 in order that the entire length of each roller 14 remains into contact with this raceway in case of axial displacement of the outer ring 12. Alternatively, it could however be possible to foresee a reduced length for the outer raceway 16a. For example, the axial length of the outer raceway 16a may be equal to the axial length of the rollers 14.

In this example, the rib 30 extends the wall of the groove 20 towards the inner ring 12.

As previously mentioned, in these illustrated examples, the first ring of the rolling bearing is the outer ring 10 whereas the second ring is the inner ring 12.

As an alternative, it could be possible to provide a reversed arrangement with the first ring forming the inner ring and the second ring forming the outer ring. In this case, the guide flanges for the rollers are provided on the outer ring, and the retaining rib is provided on the inner ring. In this case, the groove inside which the inner wire race is disposed extends from the axial bore of the inner ring.

In the illustrated examples, the rolling bearing is provided with one row of radial rollers. Alternatively, the rolling bearing may comprise at least two rows of radial rollers, each row of radial roller being radially interposed between associated first and second wire races. In another variant, the rolling bearing may also comprise at one row of radial rollers radially interposed between first and second wire races, and at least one row of axial rollers axially interposed between wire races mounted in the inner and outer rings or between raceways directly formed on the rings.

The invention claimed is:

1. A rolling bearing comprising:
a first ring, and
a second ring positioned concentrically with the first ring to define a radial space therebetween,
at least one first wire race mounted in the first ring,
at least one second wire race mounted in the second ring, and
at least one row of radial rollers positioned in the radial space between raceways provided on the first and second wire races, the second ring comprising at least two guide flanges to axially retain therebetween the row of radial rollers, the at least two guide flanges each having a first edge abutting the row of radial rollers, wherein
the first ring comprises at least one retaining rib extending into the radial space that exists between the first and second rings and towards the second ring, the at least one retaining rib protruding radially relative to the raceway of the first wire race, the at least one retaining rib having a second edge capable of abutting the row of radial rollers when centers of the first and second wire races are axially offset, and
when the first and second wire races are axially aligned the second edge of the at least one retaining rib is not axially aligned with either of the first edges of the at least two guide flanges.

2. The rolling bearing according to claim 1, wherein the retaining rib extends from an axial cylindrical surface of the first ring, the axial cylindrical surface having a groove inside which the first wire race is disposed.

3. The rolling bearing according to claim 1, wherein the retaining rib and the first ring are made into one part.

4. The rolling bearing according to claim 1, wherein, along a radial plane of the rolling bearing, the first and second wire races are symmetric with regard to the rotation axis of the roller.

5. The rolling bearing according to claim 1, wherein the axial length of the raceway of the first wire race is bigger than the axial length of the raceway of the second wire race.

6. The rolling bearing according to claim 5, wherein the axial length of the raceway of the first wire race is bigger than the axial length of the radial rollers of the row.

7. A rolling bearing comprising:
a first ring, and
a second ring positioned concentrically with the first ring to define a radial space therebetween,
at least one first wire race mounted in the first ring,
at least one second wire race mounted in the second ring, and
at least one row of radial rollers positioned in the radial space between raceways provided on the first and second wire races, the second ring comprising at least two guide flanges to axially retain therebetween the row of radial rollers, wherein
the first ring comprises at least one retaining rib extending into the radial space that exists between the first and second rings and towards the second ring, the retaining rib protruding radially relative to the raceway of the first wire race, wherein
a first guide flange of the at least two guide flanges of the second ring is axially located on the same side of the rollers as the retaining rib, a second guide flange of the at least two guide flanges is located on the opposite side of the roller relative to the retaining rib, and wherein
the first guide flange has a radial dimension smaller than the radial dimension of the second guide flange.

8. A rolling bearing comprising:
a first ring, and
a second ring positioned concentrically with the first ring to define a radial space therebetween,
at least one first wire race mounted in the first ring,
at least one second wire race mounted in the second ring, and
at least one row of radial rollers positioned in the radial space between raceways provided on the first and second wire races, the second ring comprising at least two guide flanges to axially retain therebetween the row of radial rollers, wherein the first ring comprises at least one retaining rib extending into the radial space that exists between the first and second rings and towards the second ring, the retaining rib protruding radially relative to the raceway of the first wire race, and wherein the guide flanges of the second ring extend radially beyond the axes of rotation of the radial rollers of the row.

9. A rolling bearing comprising:

a first ring, and a second ring positioned concentrically with the first ring to define a radial space therebetween, at least one first wire race mounted in the first ring, at least one second wire race mounted in the second ring, and at least one row of radial rollers positioned in the radial space between raceways provided on the first and second wire races, the second ring comprising at least two guide flanges to axially retain therebetween the row of radial rollers, wherein the first ring comprises at least one retaining rib extending into the radial space that exists between the first and second rings and towards the second ring, the retaining rib protruding radially relative to the raceway of the first wire race, wherein the retaining rib extends from an axial cylindrical surface of the first ring, the axial cylindrical surface having a groove inside which the first wire race is disposed, wherein the axial length of the raceway of the first wire race is bigger than the axial length of the raceway of the second wire race, and wherein the retaining rib is positioned so that retaining ring extends from a wall surface that forms the groove of the first ring such that the groove and retaining rib form a continuous surface.

\* \* \* \* \*